United States Patent
Ueno et al.

(10) Patent No.: US 7,750,303 B2
(45) Date of Patent: Jul. 6, 2010

(54) RADIOLOGICAL IMAGING APPARATUS AND POSITRON EMISSION TOMOGRAPHIC APPARATUS

(75) Inventors: Yuuichirou Ueno, Hitachi (JP); Kensuke Amemiya, Hitachinaka (JP); Norihito Yanagita, Hitachi (JP); Takafumi Ishitsu, Hitachi (JP); Tomoyuki Seino, Hitachi (JP); Takashi Matsumoto, Hadano (JP); Shinobu Irikura, Hadano (JP)

(73) Assignee: Hitachi, Ltd., Tokyo (JP)

( * ) Notice: Subject to any disclaimer, the term of this patent is extended or adjusted under 35 U.S.C. 154(b) by 615 days.

(21) Appl. No.: 11/355,136

(22) Filed: Feb. 16, 2006

(65) Prior Publication Data
US 2006/0186341 A1    Aug. 24, 2006

(30) Foreign Application Priority Data
Feb. 22, 2005   (JP)   ............................. 2005-045625

(51) Int. Cl.
*G01T 1/161* (2006.01)
*G01T 1/24* (2006.01)
(52) U.S. Cl. .............................. 250/363.04; 250/336.1; 250/370.08; 250/370.09; 327/540
(58) Field of Classification Search .............. 250/336.1, 250/363.04, 370.09, 515.1, 363.05; 327/540
See application file for complete search history.

(56) References Cited

U.S. PATENT DOCUMENTS

| | | | |
|---|---|---|---|
| 4,868,393 A | 9/1989 | Kiri et al. | |
| 6,236,051 B1 | 5/2001 | Yamakawa et al. | |
| 6,285,550 B1 * | 9/2001 | Belady | 361/704 |
| 6,411,522 B1 * | 6/2002 | Frank et al. | 361/800 |
| 6,472,667 B1 * | 10/2002 | Kline et al. | 250/370.09 |
| 6,972,410 B2 | 12/2005 | Takeda | |
| 7,026,622 B2 | 4/2006 | Kojima et al. | |
| 7,119,340 B2 | 10/2006 | Tsuchiya et al. | |
| 7,138,634 B2 | 11/2006 | Yamakawa | |
| 7,154,989 B2 | 12/2006 | Ueno et al. | |
| 7,297,958 B2 | 11/2007 | Kojima et al. | |
| 2003/0026382 A1 * | 2/2003 | Takeda | 378/19 |
| 2003/0108147 A1 * | 6/2003 | Kojima et al. | 378/19 |

(Continued)

FOREIGN PATENT DOCUMENTS

JP   63-49140   3/1988

(Continued)

OTHER PUBLICATIONS

Office Action dated May 12, 2009 (2 pages).

*Primary Examiner*—David P Porta
*Assistant Examiner*—Yara B Green
(74) *Attorney, Agent, or Firm*—Dickstein Shapiro LLP

(57) ABSTRACT

A positron emission tomography apparatus installs a plurality of detector units in the circumference of a bed. The detector unit installs a plurality of combined substrates including detectors, analogue ASICs, and a digital ASIC and a voltage adjustment device inside a housing. A partition plate installed inside the housing separates the region inside the housing into a first region installed with the combined substrates and a second region installed with the voltage adjustment device. The partition plate blocks noise generated in the voltage adjustment device so as not to affect γ-ray detection signals outputted from the detectors, thereby preventing the effect of the noise generated in the voltage adjustment device toward γ-ray detection signals and shortening the examination time.

17 Claims, 9 Drawing Sheets

U.S. PATENT DOCUMENTS

| | | |
|---|---|---|
| 2004/0195944 A1* | 10/2004 | Sugihara .................. 312/283 |
| 2005/0067579 A1* | 3/2005 | Tsuchiya et al. ....... 250/370.15 |
| 2005/0178970 A1 | 8/2005 | Amemiya et al. |

FOREIGN PATENT DOCUMENTS

| | | |
|---|---|---|
| JP | 4-203997 | 7/1992 |
| JP | 4-218791 | 8/1992 |
| JP | 7-29489 | 6/1995 |
| JP | 9-281243 | 10/1997 |
| JP | 11-344573 | 12/1999 |
| JP | 2000-321357 | 11/2000 |
| JP | 2003-167058 | 6/2003 |
| JP | 2003-255048 | 9/2003 |
| JP | 2004-144529 | 5/2004 |
| JP | 2004-151089 | 5/2004 |

* cited by examiner

RADIOLOGICAL IMAGING APPARATUS AND POSITRON EMISSION TOMOGRAPHIC APPARATUS

BACKGROUND OF THE INVENTION

The present invention relates to a radiological imaging apparatus and a positron emission tomographic apparatus.

In the conventional radiological imaging apparatus, there has been an apparatus in which γ-rays emitted from an examinee who is a subject to be examined is detected by using a detector comprising a scintillator, a photomultiplier tube, and the like so that a tomographic of the subject is obtained (for example, JP-U-7-29489 (paragraphs [0007]-[0008], FIG. 1, FIG. 2)). This detector, for example, is constituted such that a large photomultiplier tube (referred to also as photomul) is placed behind a single crystal such as a sheet of big NaI and the like, and is formed in a single layer in the direction of the radiation of γ-rays, and 511 KeV or around that value which is an energy of γ-rays from the subject is detected. Consequently, no energy of low γ-rays is detected. Further, there has been disclosed a technology for solving a heating problem arising from power consumption of 250 W by a radiation detecting element in the radiological imaging apparatus (for example, JP-A-63-49140 (Page 2)).

Now, as the radiological imaging apparatus of recent years, particularly as the positron emission tomographic apparatus, a positron emission tomographic apparatus using a semiconductor radiation detector is considered so as to highly accurately detect a position of generating source of γ-rays in the examinee (for example, JP-A-2003-167058 (Page 2)). This positron emission tomographic apparatus disposes semiconductor radiation detectors of a plurality of layers in the direction orthogonal to the longitudinal direction of a bed. For example, γ-rays having passed through the semiconductor radiation detector inside the inner most layer are detected by the semiconductor radiation detector inside the layer located outside thereof. Further, one γ-ray from a pair of γ-rays emitted from the examinee is absorbed in a part (for example, 300 keV) of energy of 511 keV in the semiconductor radiation detector inside the inner most layer, and is scattered, and after that, the remaining energy (for example, 211 keV) is sometimes absorbed in the semiconductor radiation detector inside the layer located outside. One semiconductor radiation detector outputs a γ-ray detection signal of energy of 300 KeV, and the other semiconductor radiation detector outputs a γ-ray detection signal of energy of 211 KeV.

In case γ-rays are scattered by the semiconductor radiation detector, a γ-ray detection signal of low energy is outputted from a plurality of semiconductor radiation detectors. When such a γ-ray radiation detection signal of low energy, for example, a γ-ray detection signal of 211 keV is affected by noise, its γ-ray detection signal cannot be used.

An object of the present invention is to provide a radiological imaging apparatus and a positron emission tomographic apparatus capable of shortening an examination time.

SUMMARY OF THE INVENTION

The feature of the present invention to achieve the above described object is that a partition member for controlling noise generated in a voltage adjustment device provided in a storage member separates the interior of the storage member into a first region disposed with a plurality of substrates including a plurality of semiconductor radiation detectors and a integrated circuit for processing radiation detection signals outputted by a plurality of semiconductor radiation detectors and a second region disposed with the voltage adjustment device for applying voltage to the semiconductor radiation detectors and the integrated circuit.

The partition member prevents noise generated by the voltage adjustment device from reaching the first region, so that the γ-ray detection signal outputted from the semiconductor radiation detector can avert any effect from noise. Hence, the utilizable energy region of the γ-ray detection signal is expanded, and the γ-ray detection signal of low energy can be also used. That is, the γ-ray detection signal generated owing to γ-rays scattered by the semiconductor radiation detector can be used for creating tomographic information. This increases a detection sensitivity of the radiological imaging apparatus, and the examination time for the examinee is shortened.

Even in case the voltage adjustment device is provided outside of the storage member without providing the partitioning member in the storage member, the same effect as described above can be obtained.

According to the present invention, the γ-ray detection signal generated owing to the γ-rays scattered by the semiconductor radiation detector can be used for creating tomographic information. Hence, the detection sensitivity is increased, and the examination time can be shortened.

Other objects, features and advantages of the invention will become apparent from the following description of the embodiments of the invention taken in conjunction with the accompanying drawings.

BRIEF DESCRIPTION OF THE DRAWINGS

FIG. 3A is a front view showing the combined substrate provided with a detector substrate and an ASIC substrate, FIG. 3B is a side view of the combined substrate, and FIG. 3C is a oblique view schematically showing the structure of a semiconductor radiation detector included in the detector substrate;

FIG. 7A is a partially broken oblique view of the camera showing a state when the detector units are installed in the camera, and FIG. 7B is a sectional view of the central part of the camera;

DESCRIPTION OF THE EMBODIMENTS

A radiological imaging apparatus and a voltage adjustment device which are one preferable embodiment of the present invention will be described below in detail with reference to the drawings from time to time. Hereinafter, a description will be made on the radiological imaging apparatus of the present embodiment, disposition (layout) of each element such as an analogue ASIC and the like on a substrate, and elements and the like applied to the present embodiment such as unitization of the substrate and the like. The analogue ASIC means an ASIC (Application Specific Integrated Circuit) processing an analogue signal, which is an IC for specific application, and is a sort of LSI.

<<Radiological Imaging Apparatus>>

Figure 1:
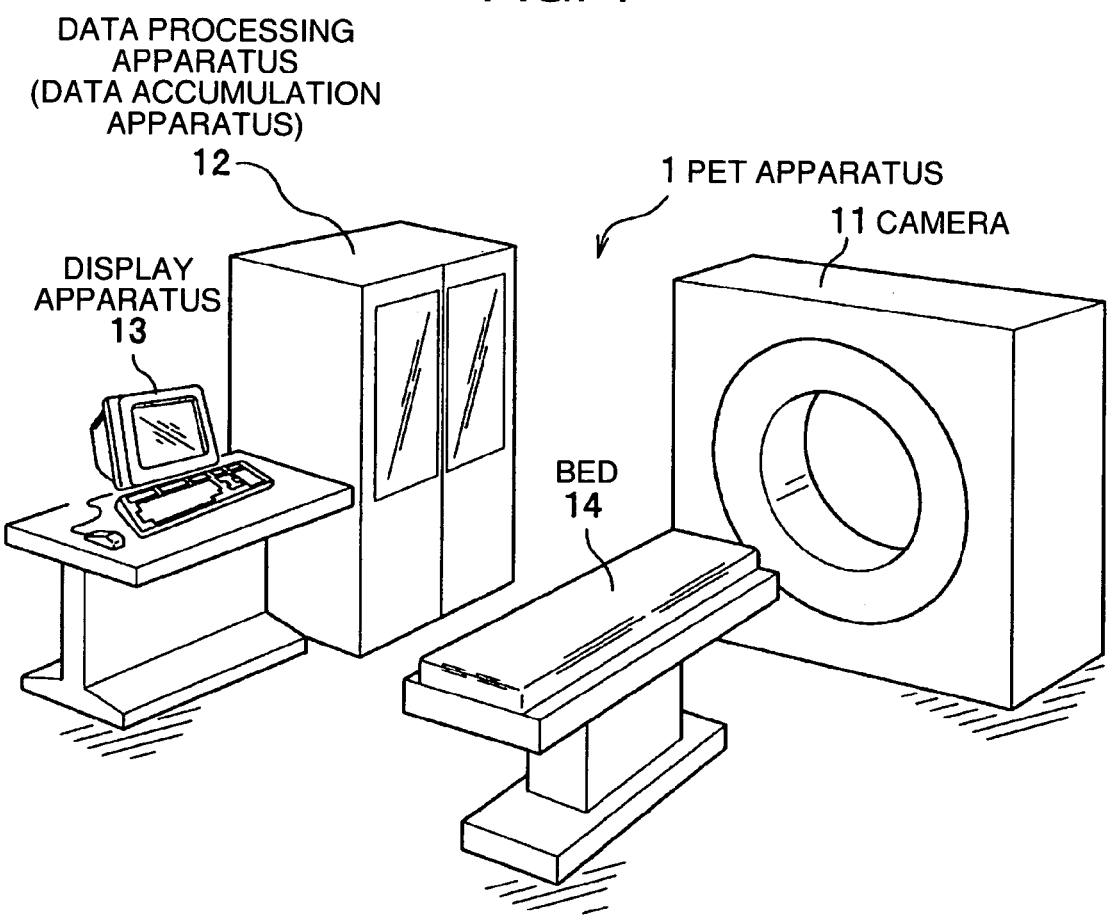
FIG. 1 is an oblique view showing a structure of a PET apparatus as a nuclear medicine diagnostic apparatus according to an embodiment of the present invention.

A positron emission tomographic apparatus (hereinafter referred to as [PET (Positron Emission Tomography) apparatus]) 1 which is a radiological imaging apparatus of the present embodiment will be described by using FIG. 1. The PET apparatus 1 is constituted by including a camera (image pickup apparatus) 11, a data processing apparatus 12, a display device 13, and the like. An examinee who is a subject to be examined is laid on a bed 14 to be photographed by using the camera 11. The camera 11 incorporates many semiconductor radiation detectors 21 (see FIGS. 3 and 5), and detects γ-rays emitted from inside the body of the examinee by the semiconductor radiation detectors 21 (hereinafter referred to as simply detectors). The camera 11 is provided with an integrated circuit (ASIC) for measuring peak values and detection times of γ-rays, and measures peak values and detection time of the detected radioactive rays (γ-rays). The data processing apparatus 12 includes a storage apparatus, a coincidence apparatus 12A (see FIG. 2), and a tomographic information creation apparatus 12B (see FIG. 2). The data processing apparatus 12 takes in packet data including peak values and detection times of the detected γ-rays and detector (channel) IDs. The coincidence apparatus 12A carries out coincidence measurement based on this packet data, especially data of detection times and detector IDs, identifies detection positions of 511 keV γ-rays, and stores them in the storage apparatus. The tomographic information creation apparatus 12B creates a functional image based on these detection positions and displays it in a display device 13.

Figure 2:
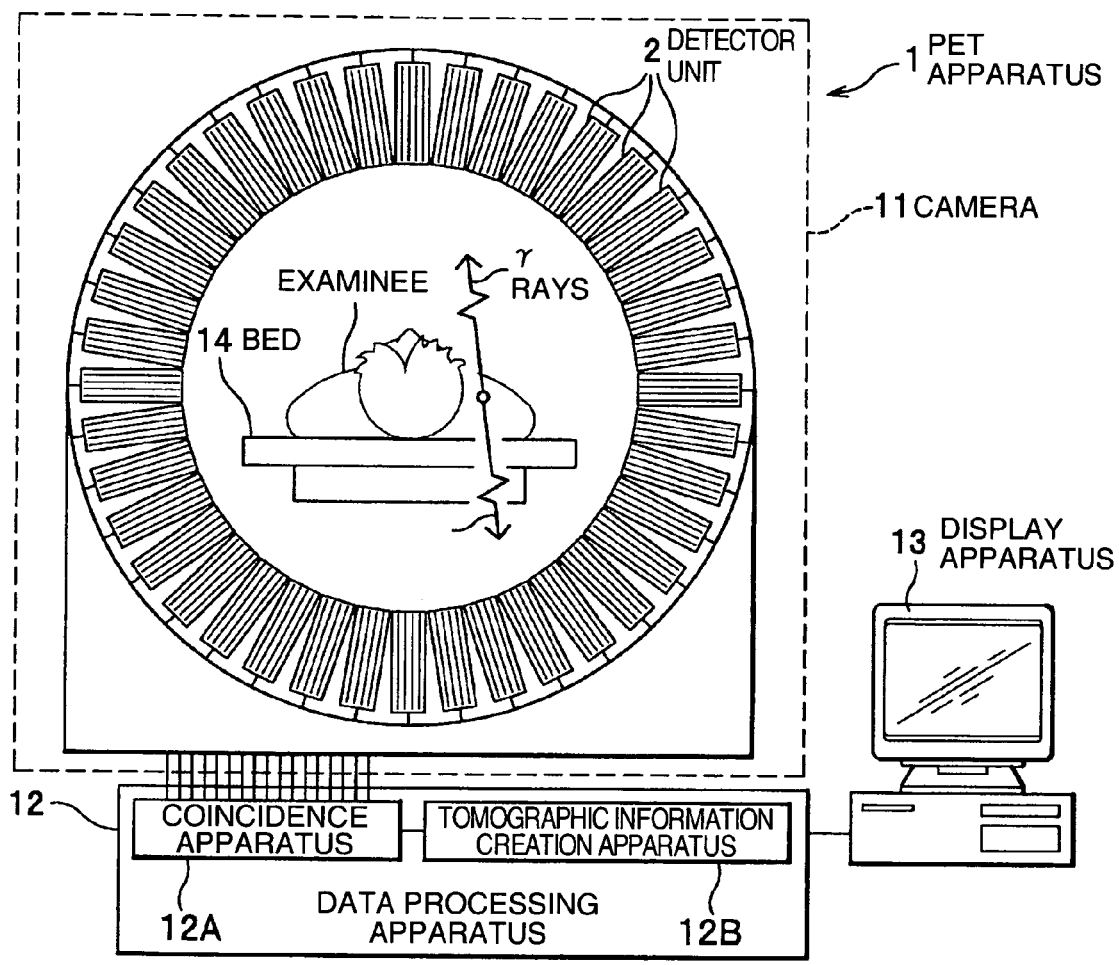
FIG. 2 is a schematic illustration of a section in the circumferential direction of a camera of the PET apparatus of FIG. 1.

As shown in FIG. 2, the interior of the camera 11 is circumferentially disposed with many detector units 2 around the bed 14 (see FIG. 5 for details) storing a plurality of combined substrates 20 (see FIG. 3 for details) provided with many detectors 21 for detecting γ-rays emitted from the examinee. The examinee is laid on a bed 14, and positioned at the center of the cameral 11. At this time, each detector 21 surrounds the circumference of the bed 14. The constitutions of the detector 21, the combined substrate 20 and the detection unit 2 will be described later in detail. The examinee is administered radiopharmaceuticals, for example, fluorodeoxyglucose (FDG) containing 18F whose half life is 110 minutes. A pair of γ-rays (annihilated γ-rays) are emitted from inside the body of the examinee in a revere direction to 180° when positrons emitted from the FDG annihilate.

Hereinafter, the characteristic portions of the present embodiment will be described.

<<Combined Substrate:Detector Substrate and ASIC Substrate>>

A detailed structure of the combined substrate 20 installed in the detector unit 2 (FIG. 5) will be described with reference to FIG. 3. The combined substrate 20 comprises a detector substrate 20A installed with a plurality of detectors 21 and an ASIC substrate 20B installed with a condenser 22, a resistor 23, an analogue ASIC (analogue integrated circuit) 24, an analogue/digital converter (hereinafter referred to as ADC) 25 and a digital ASIC (digital integrated circuit) 26.

(Detector Substrate)

Figure 3A:
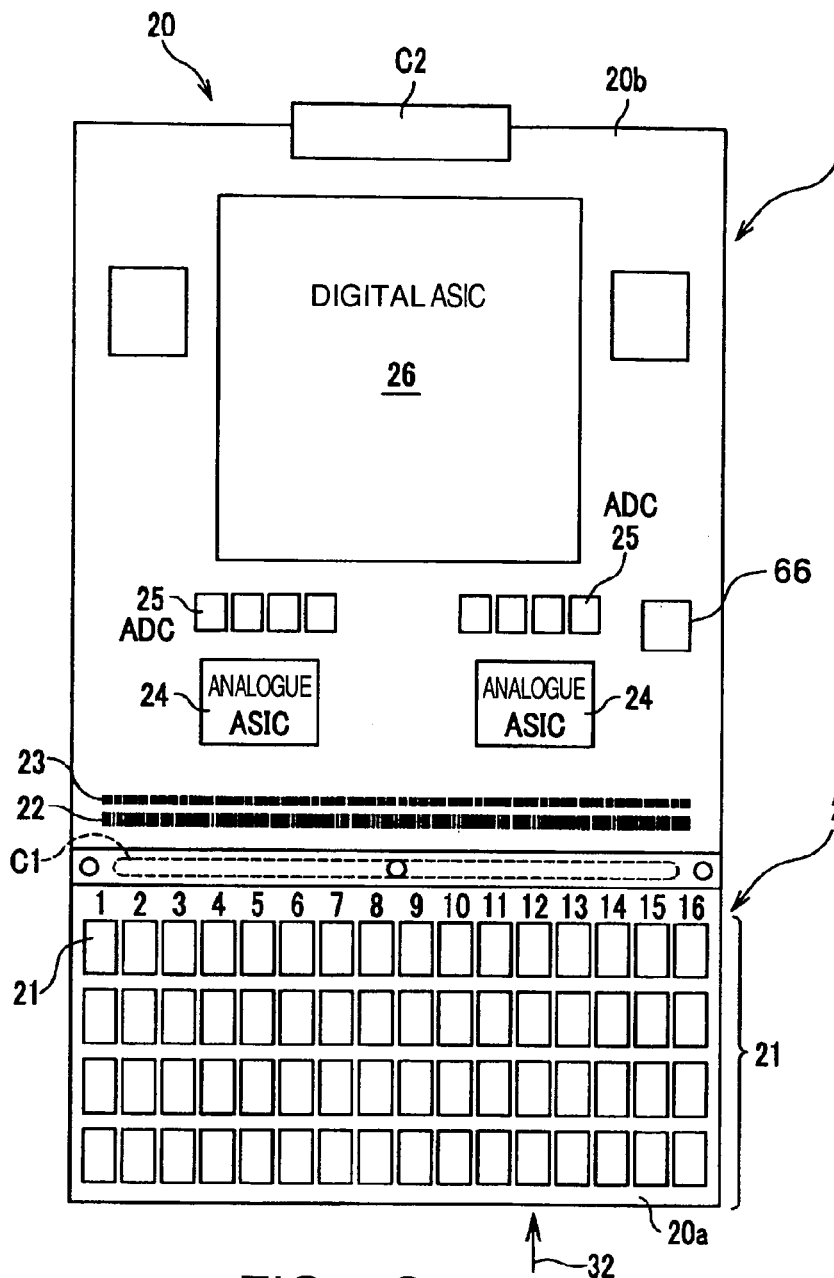
FIGS. 3A to 3C show a structure of a combined substrate included in a detector unit of FIG. 2.
Figure 3B:
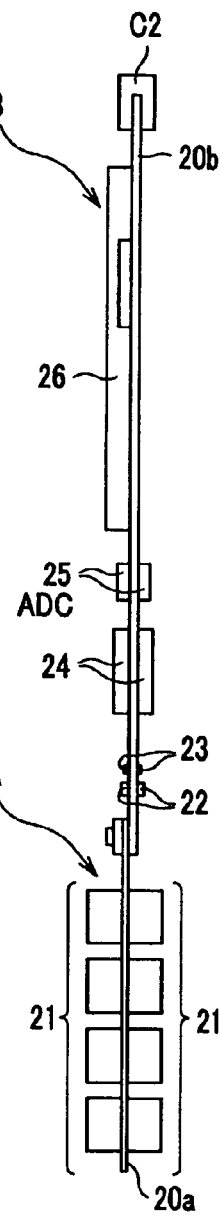
Figure 3C:
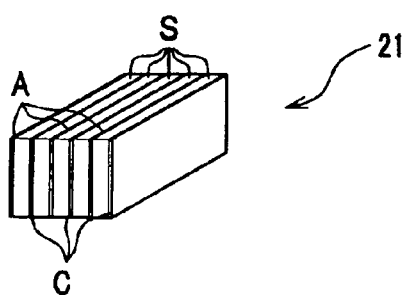

Referring to FIGS. 3A to 3C, the detector substrate 20A installed with the detectors 21 will be described. As shown in FIG. 3A, the detector substrate 20A is installed (mounted) on one face of the substrate body 20a with a plurality of detectors 21 arranged in a lattice pattern (four rows of 16 detectors 21=horizontal 16×vertical 4=total 64 detectors). In the radius direction of the camera 11, the detectors 21 are disposed in four rows in the substrate body 20a. The 16 detectors 21 in the horizontal direction are disposed orthogonal to the axial direction of the camera 11, that is, orthogonal to the longitudinal direction of the bed 14. Further, as shown in FIG. 3B, since both faces of the detector substrate 20A are installed with the semiconductor radiation detectors 21, one detector substrate 20A is installed with a total of 128 detectors 21. Here, as the number of detectors 21 to be installed increases, it is easier to detect γ-rays, and it is possible to increase position accuracy when γ-rays are detected. Hence, the detectors 21 are installed on the detector substrate 20A as tightly as possible. In FIG. 3A, in case γ-rays emitted from the examinee on the bed 14 travel from bottom to top in the Figure (direction indicated by an arrow 32, that is, radius direction of the cameral 11), the disposing of the detectors 21 in the left to the right direction on the detector substrate 20A tightly is preferable because, in this way, the number of γ-rays that pass by (the number of γ-rays that pass through the gaps between the detectors 21) can be reduced. This can increase detection efficiency of γ-rays, and can increase spatial resolution of an image to be obtained.

The detector substrate 20A of the present embodiment, as shown in FIG. 3B, installs the detectors 21 on both faces of the substrate body 20a, and therefore, the substrate body 20a can be shared by both sides compared to the case where the detectors 21 are disposed only on one side. For this reason, it is possible to reduce the number of substrate main bodies 20a by half, and dispose the detectors 21 more tightly in the longitudinal direction of the bed 14 in the camera 11. Moreover, as described above, the number of the detector substrates 20A (combined substrates) can be reduced by half, and therefore, there is a merit of saving labor hour and the like to mount the combined substrate 20 on the housing 30 (see FIG. 5) to be described later.

In the above description, though the 16 horizontal detectors 21 are disposed in the circumferential direction of the camera 11, such disposition is not limited to this. For example, the 16 horizontal detectors 21 may be disposed in the axial direction of the camera 11.

As shown in FIG. 3C, each detector 21 has a laminated structure laminated with semiconductor materials S comprised of the above described thin-plate semiconductor single crystals. As the semiconductor material S, CdTe (cadmium telluride) is used. Further, as the semiconductor material S, TlBr (thallium bromide) or GaAs (gallium arsenide) may be used. The detector 21 is provided with an anode A and a cathode C on both faces confronting each other of the semiconductor materials S. At the examination time, the cathode C is, for example, applied with a bias voltage of 300 V. Hence, between the anode A and the cathode C, for example, a potential difference (voltage) of 300 V is generated for charge collection. This voltage is supplied to the detector substrate 20A side from the ASIC substrate 20B side through a connector C1 (FIG. 3A). Further, the signal detected by each detector 21 is supplied to the ASIC substrate 20B side through the connector C1. Thus, the substrate body 20a of the detector substrate 20A is provided with unillustrated on-board wire (for charge collection and signal exchange) for connecting the connector C1 and each detector 21. This on-board wire has a multi-layered structure. In the present embodiment, each semiconductor material S of the detector 21 is disposed vertical to the substrate body 20a. However, the detector 21 may be provided so that each semiconductor material S is in parallel with the substrate body 20a.

(ASIC Substrate)

Next, the ASIC substrate 20B mounted with the ASIC will be described. As shown in FIG. 3A, the ASIC substrate 20B is installed with two analogue ASICs 24 and one digital ASIC 26 on one face of the substrate body 20b. Further, as shown in FIG. 3B, since the analogue ASICs 24 are installed on both faces of the substrate body 20b, one ASIC substrate 20B includes a total of four analogue ASICs 24. Further, the ASIC substrate 20B includes eight (4×2) ADCs 25 installed on one face of the substrate body 20b, and 16 ADCs 25 on both faces. Further, both faces of one substrate body 20b are installed with the condensers 22 and the resistors 23 by the number corresponding to the number of detectors 21. Further, to electrically connect these condensers 22, resistors 23, analogue ASICs 24, ADCs 25, and digital ASICs 26, the ASIC substrate 20B (substrate body 20b) is provided with unillustrated on-board wire similarly to the detector substrate 20A. This on-board wire also has a laminated structure. A series regulator 66 shown in FIG. 3A will be described later.

These elements 22, 23, 24, 25 and 26 (on-board wires) are disposed such that the signal supplied from the detector substrate 20A is supplied to the condenser 22, the resistor 23, the analogue ASIC 24, the ADC 25, and the digital ASIC 26 in that order.

The ASIC substrate 20B includes a connector C1 connected to the on-board wire connected to each condenser 22 and performing electrical connection with the detector substrate 20A, and a substrate connector C2 performing electrical connections with a data processing device side (unit combination FPGA (Field Programmable Gate Array) side to be described later). The detector substrate 20A also includes the connector C1 connected to the on-board wire connected to each detector 21.

(Connection Structure between Detector Substrate and ASIC Substrate)

The connection structure between the detector substrate 20A and the ASIC substrate 20B will be described.

The detector substrate 20A and the ASIC substrate 20B are not connected with their respective end faces (ends) by abutting against each other, but as shown in FIG. 3B, by providing overlap areas overlapped in the vicinity of ends and mutually connecting the connectors C1 existing in these overlapped areas. This connection is made in a detachably attachable manner (separation and connection) using screws and the like for cramping. This connection is made for the following reason. That is, when the combined substrate 20 in which the detector substrate 20A and the ASIC substrate 20B are connected (combined) is supported on one end (cantilever support) or on both ends in the horizontal direction, a force which flexes or bends the combined substrate 20 downward is applied to the central area (connection area) of the combined substrate 20. Here, in case the connection areas are such that both end faces thereof mutually abut against each other, the connection areas are easily flexed and bent, which is not preferable.

With consideration given to this aspect, in the present embodiment, the detector substrate 20 and the ASIC substrate 20B are not connected with their respective end faces by mutually abutting against each other, but as described above, by providing overlap areas overlapped in the vicinity of the ends. This improves toughness against flexure and bending compared to the case where the connection of the end faces is made by mutually abutting against each other, which is preferable. Moreover, improvement of toughness against flexure and bending of the combined substrate, for example, suppresses dislocation of the detectors 21 and prevents deterioration of accuracy of identifying the positions at which γ-rays are generated.

The detector substrate 20A and the ASIC substrate 20B are electrically connected by using the overlapped areas. Hence, as shown in FIG. 3B, each overlapped area of the detector substrate 20A and the ASIC substrate 20B is provided with the connector C1 (FIG. 3A) for electrically connecting the on-board wires of both substrates 20A and 20B. Using such electrical connection structure through the connector C1 between the detector substrate 20A and the ASIC substrate 20B allows signals to be transmitted from the detector substrate 20 to the ASIC substrate 20B with low loss. When the loss is small, energy resolution on the part of the detection 21 improves.

Further, as described above, the connection between the detector substrate 20A and the ASIC substrate 20B is made by screws and the like in a detachably attachable manner. Thus, even when trouble occurs in the semiconductor radiation detectors 21 and the ASICs 24 and 26, all that should be done is just to replace the part with trouble. Therefore, this can eliminate waste of replacing the whole combined substrate 20 just because of trouble with one part thereof. Since the electrical connection between the detector substrate 20A and the ASIC substrate 20B is made by the connector C1, connection or release of connection (coupling or release of coupling) between the substrates can be easily made.

Although the above described structure connects one detector substrate 20A to the ASIC substrate 20B, the detector substrate may be divided into a plurality of portions. For example, with eight detectors 21 in the horizontal direction and four detectors 21 in the vertical direction mounted as one detector substrate, two detector substrates may be connected to the ASIC substrate. In this structure, in case one detector 21 has trouble, of the two detector substrates, only the one including the faulty defector 21 needs to be replaced, and it is, therefore, possible to reduce the waste in maintenance (cost reduction).

(Element Layout)

Next, the layout of the elements such as the detector 21 and the ASICs 24 and 26 in the combined substrate 20 will be described with reference to FIGS. 3A to 3C and 4.

Figure 4:
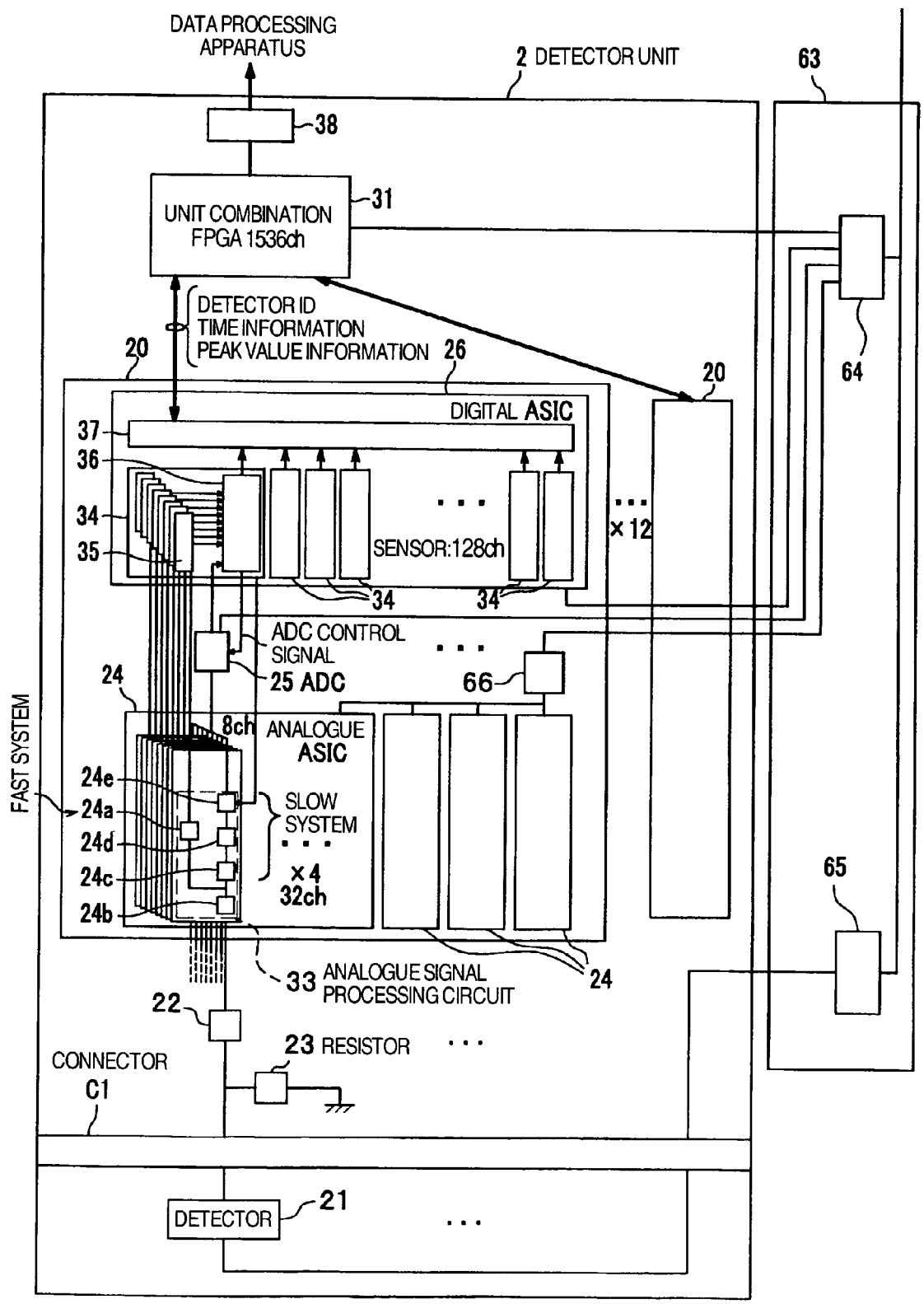
FIG. 4 is a block diagram showing a schematic structure of a digital ASIC, and a connection relationship between an analogue ASIC and the digital ASIC.

As shown in FIG. 4, the detector 21 is connected to the analogue ASIC 24 through the connecter C1 and the condenser 22 by the electrical wire and a detection signal of γ-rays detected by the detector 21 passes through the condenser 22 through the electrical wire, and is processed by the analogue ASIC 24. Further, the signal processed by the analogue ASIC 24 is also processed by the ADC 25 and the digital ASIC 26. The electrical wire connecting the connector C1 and the condenser 22 is connected with the resistor 23 with the other end thereof earthed.

Here, the shorter the length of the circuit and the length (distance) of the wire, the better because the effect of noise and attenuation of signals en route are reduced. Further, in case coincidence measurement processing is carried out by the PET apparatus 1, shorter length of circuit or wire is preferred because its time delay is smaller (preferable because accuracy of the detection time is not lost). Hence, in the present embodiment, the elements 21, 22, 23, 24, 25, and 26 are disposed (laid out) in order of the detector 21, the condenser 22, the resistor 23, the analogue ASIC 24, the ADC 25, and the digital ASIC 26 from the center axis of the camera 11 outward in the radius direction of the camera 11 as shown in FIG. 3A. This order is the same as the processing order of the signals by the elements of 21, 22, 23, 24, 25, and 26 (see FIG. 4). That is, from the center axis of the camera 11 outward, [the detector, the analogue integrated circuit, the AD converter, and the digital integrated circuit are disposed on the substrate in this order and wired in this order]. Thus, it is possible to transmit a weak γ-ray detection signal outputted from the detector 21 having detected γ-rays to the analogue ASIC 24 with the length (distance) of the wire shortened.

Since the processing such as amplification of the γ-ray detection signal is carried out by the analogue ASIC 24, even if the length of the wire from the analogue ASIC 24 onward is long, the γ-ray detection signal is less susceptible to noise. That is, considering the noise affecting the γ-ray detection signal, there is no problem even if the length of the wire from the analogue ASIC 24 onward is long. However, when the length of the wire is long, there is a delay in transmission time of signals, and as described above, accuracy of the detection time may deteriorate.

In the present embodiment, since not only the detector 21 but also the analogue ASIC 24 and the digital ASIC 26 are included in the combined substrate 20, the detector 21, the analogue ASIC 24 and the digital ASIC 26 can be disposed in the longitudinal direction of the bed 14, that is, in the direction orthogonal to the body axis of the examinee, this eliminates the need to make a length in the bed longitudinal direction of the camera (imaging apparatus) 11 longer than necessary. Although it is conceivable that they are disposed in the longitudinal direction of the bed 14 outside of the radius direction of a group of detectors 21 disposed circularly with the analogue ASIC 24 and the digital ASIC 26, this makes the length in the bed longitudinal direction of the camera 11 longer than necessary. Further, since the semiconductor radiation detector is used as the detector 21 and the analogue ASIC 24 and the digital ASIC 26 are used as the signal processing unit, the length of the combined substrate 20 in the longitudinal direction is shortened, and compared to the case where a scintillator is used, the length in the orthogonal direction of the camera 11 can be made remarkably short. Further, since the combined substrate 20 is disposed with the detector 21, the analogue ASIC 24 and the digital ASIC 26 in that order in the longitudinal direction, the length of the wires connecting these elements can be made short, and the wires in the substrate can be simplified.

Here, in the present embodiment, one analogue ASIC 24 is connected to 32 detectors 21 to process the γ-ray detection signals outputted from the detectors 21. As shown in FIG. 4, one analogue ASIC 24 is provided with 32 sets of an analogue signal processing circuit (analogue signal processing apparatus) 33 comprising a slow system and a fast system. The analogue signal processing circuit 33 is provided for each detector 21, and one analogue signal processing circuit 33 is connected to one detector 21. Here, the fast system has a timing pick off circuit 24a to output a timing signal for identifying a detection time of γ-rays. Further, the slow system is connected and provided with a polarity amplifier (linear amplifier) 24c, a band pass filter (waveform shaping apparatus) 24d, and a peak hold circuit (peak value holding apparatus) 24e in that order for the purpose of calculating a peak value of detected γ-rays. The slow system is named [slow] because it takes a certain degree of process time to calculate the peak value. Reference numeral 24b denotes a charge amplifier (preamplifier). The γ-ray detection signal outputted from the detector 21 and thence passed through the condenser 22 is amplified by a charge amplifier 24b and the polarity amplifier 24c. The amplified γ-ray detection signal is inputted to the peak hold circuit 24e through the band pass filter 24d. The peak hold circuit 24e holds a maximum value of the γ-ray detection signal, that is, a peak value of the γ-ray detection signal proportional to energy of detected γ-rays. One analogue ASIC 24 is an LSI which integrates 32 sets of analogue signal processing circuits 33.

Although the condenser 22 and the resistor 23 can be provided inside the analogue ASIC 24, in the present embodiment, the condenser 22 and the resistor 23 are disposed outside of the analogue ASIC 24 for reasons such as obtaining appropriate capacitance and appropriate resistance and reducing the size of the analogue ASIC 24. The condenser 22 and the resistor 23 are preferably provided outside because in this way variations in the individual capacitance and resistance are reduced.

In the analogue ASIC 24 shown in FIG. 4, the output of the slow system of this analogue ASIC 24 in the present embodiment is designed to be supplied to the ADC (analogue/digital converter) 25. Moreover, the output of the fast system of the analogue ASIC 24 is designed to be supplied to the digital ASIC 26.

The analogue ASIC 24 and each ADC 25 are connected by one wire transmitting the slow system signals for 8 channels in one lot. Further, respective analogue ASIC 24 and digital ASIC 26 are connected by 32 wires transmitting the fast system signals of 32 channels one by one. That is, one digital ASIC 26 is connected to four analogue ASICs 24 through a total of 128 wires.

The output signal of the slow system outputted from the analogue ASIC 24 is an analogue peak value. Further, the output signal of the fast system outputted from the analogue ASIC 24 to the digital ASIC 26 is a timing signal showing the timing corresponding to the detection time. Of these signals, the peak value which is the slow system output is inputted to the ADC 25 by the wire (wire putting the above described 8 channels into one lot) connecting the analogue ASIC 24 and the ADC 25, and is converted into a digital signal by the ADC 25. The ADC 25 converts a peak value, for example, into a digital peak value of 8-bit (0 to 255). Further, the timing signal which is the fast system output is supplied to the digital ASIC 26 by the wire connecting the analogue ASIC 24 and the digital ASIC 26.

The ADC 25 transmits the digitalized 8-bit peak value information to the digital ASIC 26. Therefore, the ADC 25 and the digital ASIC 26 are connected by a wire. The digital ASIC 26 is connected to the ADCs 25 by a total of sixteen wires since sixteen ADCs 25 are available on both faces. One ADC 25 processes signals corresponding to 8 channels (signals corresponding to eight detection elements). The ADC 25 is connected to the digital ASIC 26 by one wire for transmission of an ADC control signal and one wire for transmission of peak value information.

The digital ASIC 26, as shown in FIG. 4, comprises a plurality of packet data generation apparatuses 34 including eight time decision circuits (time information generation apparatuses) 35 and one ADC control circuit (ADC control apparatus) 36, and a data transfer circuit (data transmission apparatus) 37, and integrates all these elements into one LSI. All the digital ASICs 26 provided for the PET apparatus 1 receive a clock signal from an unillustrated clock generation apparatus (crystal oscillator) of 500 MHz, and operate synchronously. The clock signal inputted to each digital ASIC 26 is inputted to respective time decision circuits 35 in all the packet data generation apparatuses 34. The time decision circuit 35 is provided for each detector 21, and inputs the timing signal from a timing pick off circuit 24a of the corresponding analogue signal processing circuit 33. The timing decision circuit 35 determines the detection time of γ-rays based on the clock signal when the timing signal is inputted. Since the timing signal is based on the fast system signal of the analogue ASIC 24, a time close to a real detection time can be set as the detection time (time information). The determination of the detection time in the PET apparatus 1 is carried out by a LET (Leading Edge Trigger) system or a CFD (Constant Fraction Discriminator) system.

The ADC control circuit 36 receives the timing signal for the timing at which γ-rays are detected from the time decision circuit 35, and identifies the detector ID. That is, the ADC control circuit 36 stores a detector ID corresponding to each time decision circuit 35 connected to the ADC control circuit 36, and can identify the detector ID corresponding to the time decision circuit 35 when time information is inputted from a certain time decision circuit 35. This is possible because the time decision circuit 35 is provided for each detector 21. Further, the ADC control circuit 36, after inputting the time information, outputs an ADC control signal including the detector ID information to the ADC 25. The ADC 25 outputs the peak value information outputted from the peak hold circuit 24e of the analogue signal processing circuit 33 corresponding to the detector ID by converting it into a digital signal. This peak value information is inputted to the ADC control circuit 36. The ADC control circuit 36 adds the peak value information to the time information and the detector ID so as to create packet data. The ADC control circuit 36 has functions of the ADC control apparatus for controlling the ADC 25 and the information combination apparatus for combining the detector ID information (detector position information), the time information and the peak value information. The information combination apparatus outputs combination information (packet information) which is the digital information including those three pieces of information. The packet data (including the detector ID, the time information, and the peak value information) outputted from the ADC control circuit 36 of each packet data generation apparatus 34 is inputted to a data transfer circuit 37.

The data transfer circuit 37 transmits the packet data, which is the digital information outputted from the ADC control circuit 36 of each packet data generation apparatus 34 to one integrated circuit (unit combination FPGA) 31 for unit combination provided in the housing 30 of the detector unit 2 (FIG. 5) which stores ten sheets of combined substrates 20, for example, periodically. The unit combination FPGA (hereinafter referred to as a FPGA) 31 transmits those pieces of the digital information to the data processing apparatus 12 through an information transmission wire connected to a connector 38.

In the present embodiment, since the ADC 25 converts the peak value information outputted from the peak hold circuit 24e corresponding to the detector ID information included in a control signal outputted from the ADC control circuit 36 into a digital signal, one ADC 25 is provided for a plurality of analogue signal processing circuits 33 in one analogue ASIC 24. Consequently, there is no need to provide one ADC 25 for each of the analogue signal processing circuit 33, and the circuit structure of the ASIC substrate 20B can be therefore significantly simplified. Also one information combination apparatus for generating combination information is enough for a plurality of analogue signal processing circuits 33 in one analogue ASIC 24, which can simplify the circuit structure of the digital ASIC 26. Further, only one ADC control apparatus for identifying the detector ID needs to be provided for a plurality of analogue signal processing circuits 33 in one analogue ASIC 24, and the circuit structure of the digital ASIC 26 can be thus simplified. Moreover, since the ADC 25 selects the peak value information from a plurality of peak hold circuits 24e according to the detector ID information from the ADC control circuit 36, there is no need for a switch changeover circuit for transferring the peak value information from a plurality of peak hold circuits 24e to the ADC 25, and this can avoid adverse effects due to noise generated in the switch changeover circuit.

According to the above mentioned description, the detector substrate 20A includes the detectors 21, and the ASIC substrate 20B includes the condenser 22, the resistor 23, the analogue ASICs 24, the ADC 25, and the digital ASIC 26. However, the detector substrate 20A may include the detectors 21, the condenser 22, the resistor 23, analogue ASICs 24, and the like, and the ASIC substrate 20B may include the ADCs 25, digital ASIC 26, and the like. With the detectors 21 and analogue ASICs 24 carried by the detector substrate 20A, the distance (wire length) between the detectors 21 and analogue ASICs 24 can be made much shorter. Hence, the effect of noise can be further reduced.

Further, the combined substrate 20 may include three substrates (the detector substrate 20A, the analogue ASIC substrate, and the digital ASIC substrate), and each substrate may be connected through a connector in a detachably attachable manner. In this case, of three substrates, the detector substrate 20A includes the detectors 21, and the analogue ASIC substrate includes the condenser 22, the resistor 23, and the analogue ASIC 24, and the digital ASIC substrate includes the ADC 25 and the digital ASIC 26. This structure separates a substrate mounting the analogue circuit from a substrate mounting the digital circuit, thereby preventing noise of the digital circuit side from entering the analogue circuit. Further, this structure separates a substrate mounting the analogue ASIC from a substrate mounting the digital ASIC, and connects them by a detachably attachable connector, and therefore, for example, even in case only the digital ASIC malfunctions, only the digital ASIC substrate needs to be replaced. Consequently, this structure can further eliminate waste.

According to the above mentioned description, the substrate body 20a installed with the detectors 21 (the detector substrate 20A) is different from the substrate body 20b (the ASIC substrate 20B) installed with the ASICs 24 and 26. Hence, for example, when both of the ASICs are soldered to a substrate by means of BGA (Ball Grid Array) using reflow, only the ASIC substrates can be soldered and this is preferable because the semiconductor radiation detector 21 need not be exposed to high temperatures. Naturally, it is possible also to dispose all the elements 21 to 26 on the same substrate and use no connector C1.

<<Detector Unit: Unitization by Storing Combined Substrate>>

Next, unitization by storing the combined substrate 20 into the housing 30 will be described. The present embodiment constitutes the detector unit 2 by storing ten combined substrates 20 into the housing (storage member) 30. The camera 11 of the PET apparatus 1 is constituted such that 30 to 40 detector units 2 are disposed in a detachably attachable manner in the circumferential direction (see FIG. 7A), so that maintenance and inspection can be easily conducted (see FIG. 2).

(Storing into Housing)

Figure 5:
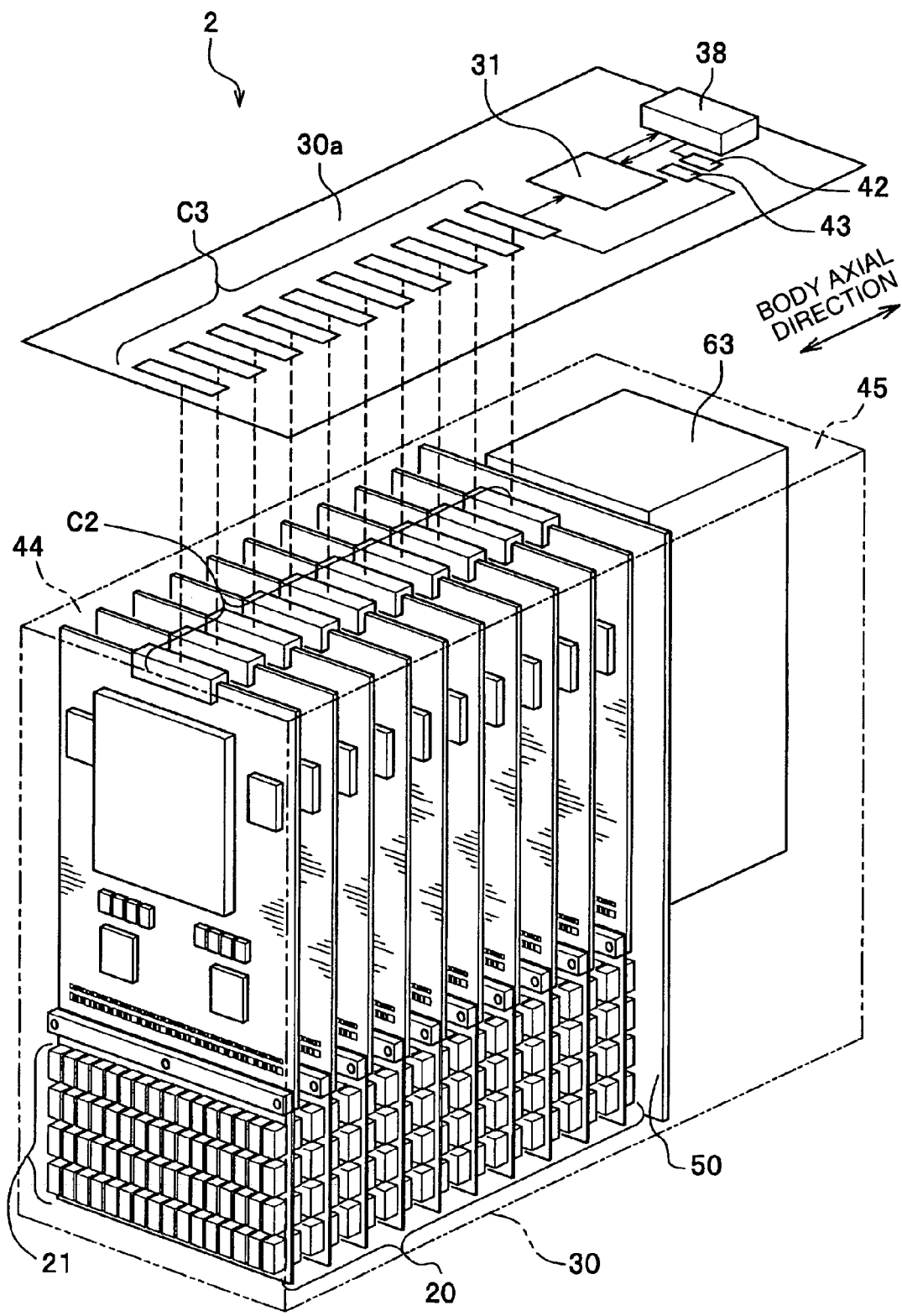
FIG. 5 is a transparent oblique view cited to explain the structure of a detector unit storing a plurality of semiconductor radiation detectors.

As shown in FIG. 5, the detector unit 2 is provided with ten combined substrates 20, the voltage adjustment device 63 for supplying a voltage for charge collection and signal processing to the ten combined substrates 20, the FPGA 31, the signal connectors for exchanging signals with the outside, the housing 30 for storing and holding power connectors and the like to receive a power source from the outside, and a partition plate 50. The partition plate 50 is disposed between the combined substrate 20 and the voltage adjustment device 63.

As shown in FIG. 5, a plurality of combined substrates (ten combined substrates) 20 have respective substrate surfaces (where the detectors 21, integrated circuits, and the like are installed) disposed and oriented in the longitudinal direction of the housing 30, and are disposed in parallel in the longitudinal direction. After the predetermined number of combined substrates 20 is disposed in the housing 30, a ceiling plate 30a is installed on the upper end of the housing 30 by screws and the like in a detachably attachable manner. Each connector C3 provided on the ceiling plate 30a is connected to a base connecter C2. The terms "upper" and "lower" sections of the housing 30 are applicable when the housing 30 is removed from the camera 11, and as shown in FIG. 2, when the housing 30 is mounted in the camera 11, the upper and the lower sections may be inverted or turned 90 degrees up and down to be positioned at the left and the right or diagonally.

Here, since the detector 21 using the semiconductor material S generates charge by reacting on a light, the housing 30 is made of a material having a light blocking effect such as aluminum and aluminum alloy, and is designed to remove gaps through which light enters. That is, the housing 30 is constituted to have a light blocking effect. In case the light blocking effect is secured by other means, the housing 30 itself need not to have the light blocking effect, and may be simply a frame to hold the detectors 21 in a detachably attachable manner (for example, there is no need for a plane member (panel) for light blocking).

Figure 7A:
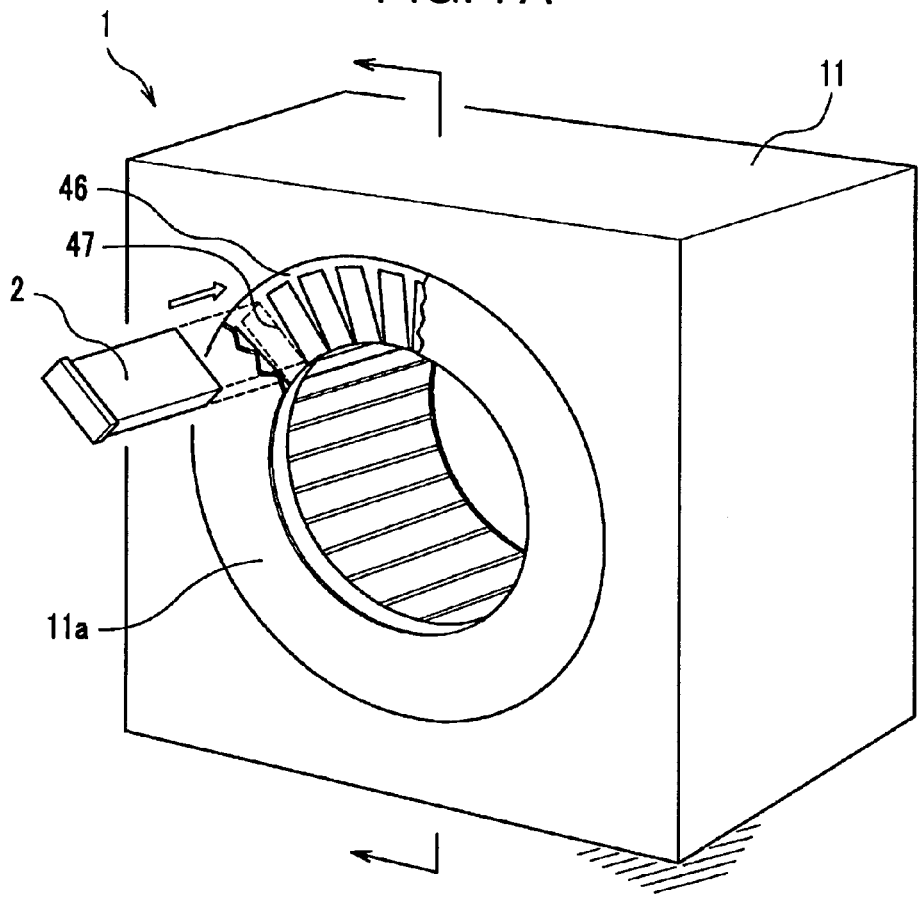
FIGS. 7A to 7B show an installed structure of the detector units to a camera.
Figure 7B:
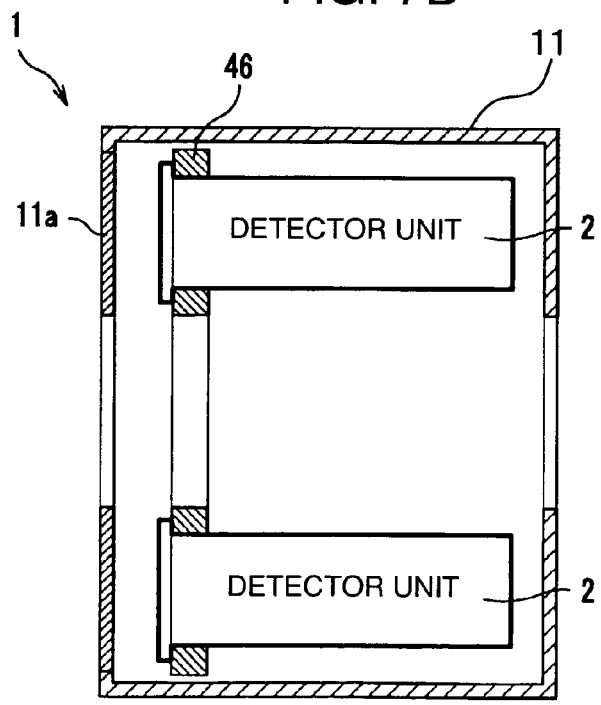

As shown in FIG. 7A, the detector unit 2 is installed on a unit support member 46 and supported. Further, as shown in FIG. 7B, the detector unit 2 is supported on one end by the unit support member 46 and installed in the camera 11. The unit support member 46 has a hollow disc (doughnut) shape, and is provided with many windows (openings) 47 (as many as the detector units to be installed) to install the detector unit 2 in the circumferential direction of the camera 11. To support the detector unit 2 on one end in this manner, the front side in the axial direction of the body of the housing 30 of the detector unit 2 is provided with a flange portion, which serves as a stopper. By installing a plurality of detector units 2 in the unit support member 46 as described above, these detector units 2 are disposed in such a manner as to surround the circumference of the bed 14. That is, the bed 14, at least at the examination time, is inserted into a region surrounded by these detector units 2. Each combined substrate 20 in each detector unit 2 is disposed in the direction to cross the longitudinal direction of the bed 14, to be specific, in the direction orthogonal to the longitudinal direction of the bed 14, and these substrate surfaces are disposed so as to be oriented toward the longitudinal direction of the bed 14. Thus, horizontal 16 detectors 21 in the detector substrate 20A are disposed in the circumferential direction. By this disposition of the combined substrate 20, the detectors 21, the analogue ASIC 24 and the digital ASIC 26 are disposed in this order so as to be isolated from the bed 14.

The detector substrate 20A is disposed with 4 rows of detectors 21 from the end face of the bed 14 side of this substrate 20A toward the ASIC substrate 20B. For this reason, by installing a plurality of detector units 2 around the bed 14, the array of the detectors 21 surrounding the bed 14 is formed for a plurality of layers (four layers in the present embodiment) in the direction to cross the longitudinal direction of the bed 14. Since a plurality of layers of the detectors 21 are disposed in the direction to cross the longitudinal direction of the bed 14, a rate of γ-rays reaching the outside of the camera 11 without being detected even by any of the detectors 21 in the cross direction is sharply reduced, and by that much, the detection sensitivity of the camera 11 is increased.

When an attempt is made to line up the detector units 2 as tightly as possible in the circumferential direction, flange portions inside the circumferential direction become obtrusive. Therefore, the flange portions that become obtrusive are removed from the housing 30, and the flange portions that are outside the circumferential direction may be left over. Or another unit support member 46 may be provided so that both end portions of the detector unit 2 are supported by the two unit support members 46.

Since the present embodiment installs the detector units 2 to the unit support members 46, many detectors 21 can be mounted in the camera 11 at a time. This can considerably shorten the time of mounting the detectors 21 on the camera 11. Further, the packet data (all the packet data for all the detectors 21 of the combined substrate 20) outputted from the data transfer circuits 37 of all the combined substrates 20 in the detection unit 2 is sent from the unit combination FPGA 31 provided in the detector unit 2 to the data processing device 12. Thus, the number of wires to transfer the packet data to the data processing device 12 in the present embodiment is also significantly reduced compared to the case where the packet data is transmitted from each data transfer circuit 37 of the combined substrate 20 to the data processing device 12.

In case the detector unit 2 is installed in the camera 11, a lid 11a is removed to expose the unit support member 46. The detector unit 2 is inserted and installed into a window 47 of the unit support member 46 until the flange portion of the detector unit 2 touches the unit support member 46. By inserting and installing the detector unit 2 in this manner, the camera 11 and the detector unit 2 are connected by the connector, and signals and power source are connected between the camera 11 and the detector unit 2.

Figure 6:
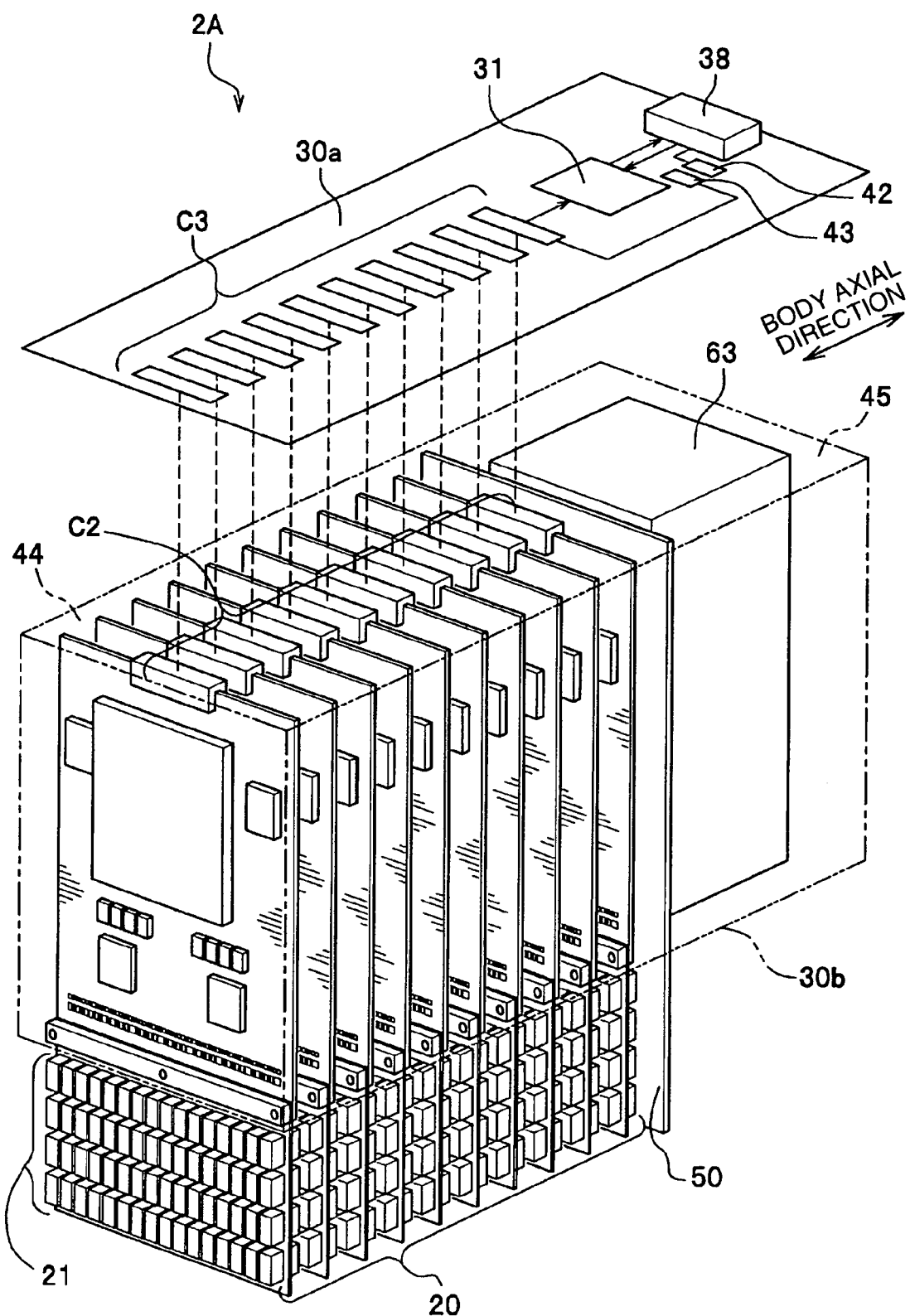
FIG. 6 is a transparent oblique view cited to explain the structure of a detector unit storing a plurality of semiconductor radiation detectors.

The detector unit may be constituted as shown in FIG. 6.

The detector unit 2A shown in FIG. 6 has a constitution in which the housing 30 is replaced by a housing 30b in the detector unit 2. While the detector unit 2A has the ASIC substrate 20B stored in the housing 30b, the detector substrate 20A is located outside of the housing 30b. Hence, all the detectors 21 are disposed outside of the housing 30b. Other structure of the detector unit 2A is the same as the detector unit 2.

The processing executed in the data processing device 12 will be described below in detail. The packet data including the detector ID for uniquely identifying (1) the peak value information, (2) the determined time information, and (3) individual pieces of the detectors 21, which are all outputted from the digital ASIC 26, is transmitted to the data processing device 12 (see FIG. 1) of the subsequent stage through the connector 38 of each detector unit 2 and the information transmission wire. A coincidence apparatus 12A of the data processing apparatus 12 performs a coincidence measurement processing (processing where when two γ-rays of the predetermined energy are detected by a time window of the setting time, these γ-rays are regarded as a pair of γ-rays generated due to extinction of one positron) based on a pair of packet data transmitted from each connector 38 of two detector units 2 located mutually in the opposite direction 180 degrees, to be specific, based on a pair of packet data generated based on each γ-ray detection signal from two detectors 21 located mutually in the opposite direction 180 degrees. The coincidence apparatus 12A counts the pair of γ-rays subjected to coincidence measurement as one γ-ray, and identifies the positions of two detectors 21 having detected the pair of γ-rays by these detector IDs. When the γ-ray detection signals detected in the time window are available three or more (the detectors 21 having detecting the γ-rays are available three or more), the data processing device 12 identifies two detectors 21 out of three or more detectors 21 available where γ-rays have entered initially by using the peak value information on those γ-ray detection signals. The pair of detectors 21 thus identified are subjected to coincidence measurement so that one count value is generated. The tomographic information creation apparatus 12B of the data processing device 12 creates tomographic information on the examinee at an integrated position of radioactive medicines, that is, at malignant tumor position by using count value obtained by coincidence measurement and position information of the detector 21. This tomographic information is displayed on a display device 13. The information such as the digital information, the count value obtained by the coincidence measurement and position information on the detectors 21, and the tomographic information and the like is stored in a storage unit of the data processing device 12.

(Power Supply)

Next, the voltage adjustment device 63 for supplying a voltage for charge collection and signal processing will be described. As shown in FIG. 5, the detector unit 2 provides the voltage adjustment device 63 for supplying a voltage for charge collection and signal processing to each detector 21, analogue ASIC 24, digital ASIC 26, and the like in a space formed inside the housing 30 at the back of the FPGA 31. This voltage adjustment device 63 is supplied with medium to high voltages from the outside, and adjusts these voltages so as to be supplied to each detector 21, analogue ASIC 24, digital ASIC 26, and the like. Incidentally, 64 detectors 21 are provided on one face of one combined substrate 20 (=detector substrate 20A) and 128 pieces on both faces. In one housing 30 (that is, one detector unit 2) 10 combined substrate 20 are stored. Hence, the voltage adjustment device 63 applies voltages to 128×10=1280 detectors 21.

In the present embodiment, the voltage adjustment device 63 built in the detector unit 2 is connected to an ACDC (Alternating Current Direct Circuit) converter 62 (see FIG. 8) supplying the medium to high voltages (for example, 48V) from the outside by a power source wire through the power source connecters 42 and 38 provided in the ceiling plate 30a. The ACDC converter 62 is disposed outside of the detector unit 2. The other terminals of the voltage adjustment device 63 are connected to 10 connecters C3, respectively, which are provided in the ceiling plate 30a through the connector 43 provided in the ceiling plate 30a, and are connected to the electrode C of each detector 21 provided in the substrate body 20a through the connector C2 of each combined substrate 20, electrical wires (not shown) in the substrate body 20b, and power source wires (not shown) in the connector C1 and the substrate body 20a. The connectors C1 and C2 include power source wire connectors other than the connectors transmitting the output signals of the detectors 21.

The voltage supplied to the voltage adjustment device 63 from the connector 42 is adjusted by the voltage adjustment device 63, and after that, it passes through the ceiling plate 30a of the housing 30, and is supplied to the ASIC substrate 20B→the detector substrate 20A→each detector 21 for every combined substrate 20. That is, the housing 30 (ceiling plate 30a) is provided with unillustrated voltage supply wires for supplying voltages to each combined substrate 20 from the voltage adjustment device 63. Further, each combined substrate 20 is provided with the voltage supply wire for supplying voltage supplied from the voltage adjustment device 63 through the substrate connecter C2 to each detector 21.

Further, the partition plate 50 is installed in the housing 30 which is a storage member. The partition plate 50 separates a region in the housing 30 which is the storage member into a first region 44 installed with a plurality of combined substrates (10 combined substrates) 20 shown in FIG. 5, and a second region 45 installed with the voltage adjustment device 63. The partition plate 50 is a partition member for blocking noise generated in the voltage adjustment device 63. The partition plate 50 is effective in such a manner as to give no adverse effect by noise generated by the voltage adjustment device 63 to the combined substrate 20, particularly to the detector 21 and the analogue ASIC 24 of the combined substrate 20. In the detector unit 2A also, the partition plate 50 is separated into the first region 44 where a section (ASIC substrate 20B) of each of a plurality of combined substrates 20 is disposed and the second region 45 where the voltage adjustment device 63 is disposed.

<<Problems of PET Apparatus>>

Particularly in the PET apparatus 1, since a coincidence measurement processing and a scattered radiation processing are carried out, it is important to quickly detect a rising signal during γ-ray detection in the fast system of the analogue ASIC 24. Further, it is also important to detect energy corresponding to low peak value recognized as not detectable so far in the slow system of the analogue ASIC 24. Moreover, since the power of 10 to 20 kW is consumed in a signal processing system, it is desirable to reduce a loss of power as much as possible in other sections (particularly power unit). Now, the power unit to realize such desire will be described.

<<Structure and Outline of Power Unit>>

Figure 8:
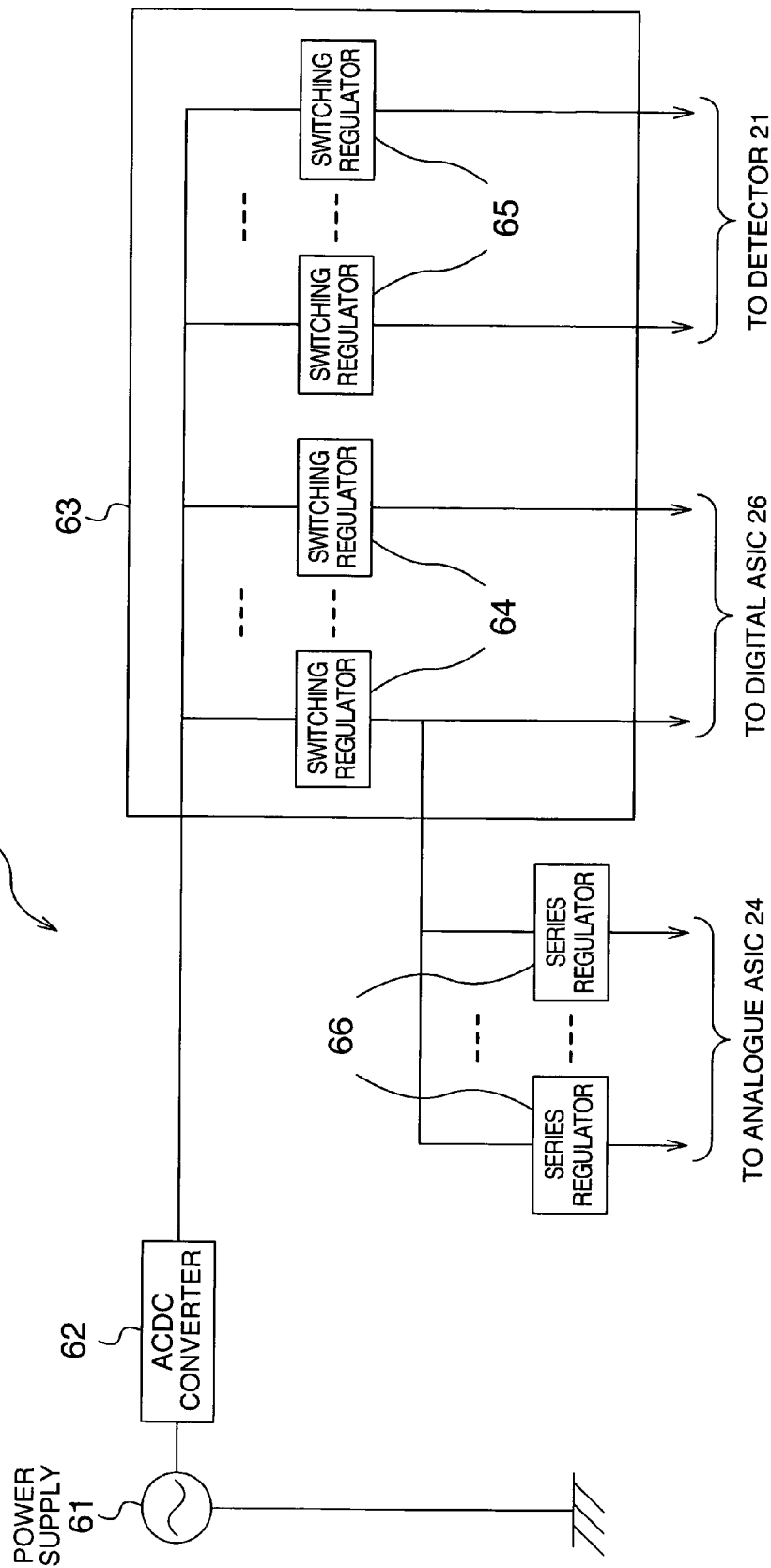
FIG. 8 is a view showing a circuit structure of a power supply apparatus according the embodiment of the present invention.

A power unit 60 used in the present embodiment shown in FIG. 8 is a unit for supplying a predetermined voltage to the detector 21, the analogue ASIC 24, the digital ASIC 26, and the like shown in FIG. 3. The power unit 60 includes the ACDC converter 62 and the voltage adjustment device 63. The ACDC converter 62 converts the alternating current received from a power source 61 into a DC voltage, and supplies its DC voltage to the voltage adjustment device 63. The ACDC converter 62 is installed at a predetermined position in the camera 11 outside of the detector unit 2. The power source 61 is installed outside of the camera 11. The voltage adjustment device 63 adjusts the DC voltage received from the ACDC converter 62 to a predetermined voltage, and supplies its adjusted voltage to the detectors 21, the analogue ASIC 24, the digital ASIC 26, and the like. The voltage adjustment device 63, the detectors 21, the analogue ASIC 24 and the digital ASIC 26, and the like are stored and constituted in one detector unit 2 (see FIGS. 5 and 6).

The voltage adjustment device 63 includes switching regulators 64 and 65. The switching regulators 64 and 65 are connected to the ACDC converter 62 by wires. A series regulator 66 is connected to the switching regulator 65 by wire. A switching regulator (first voltage adjuster) 64 steps-down the DC voltage received from the ACDC converter 62, and supplies its stepped-down DC voltage to a digital signal processing system (ADC 25, digital ASIC 26, and the like) and the series regulator 66. The switching regulator (second voltage adjuster) 65 boosts the DC voltage received from the ACDC converter 62, and supplies its boosted DC voltage to the detectors 21. The series regulator 66 steps-down and stabilizes the DC voltage received from the switching regulator 64, and after that, supplies its DC voltage to the analogue ASIC 24.

The voltage adjustment device 63 is disposed in the second region inside the housing 30 as described above. The series regulator (third voltage adjuster) 66 is installed in the ASIC substrate 20B (see FIGS. 3 and 4). It is possible also to install the series regulator 66 inside the voltage adjustment device 63 as one section of the voltage adjustment device 63. In this case, the series regulator 66 is disposed inside the second region 45.

Here, the switching regulars 64 and 65 switch on and off (switching) an input voltage at a high frequency (for example, several tens kHz) to convert it into a pulse, thereby controlling an output voltage. They can perform not only stepping-down, but also boosting and reversal of positive and negative. Moreover, they are power source circuits having few power loss and excellent in power conversion efficiency. Further, the series regulator 66 is a constant voltage DC power source circuit of continuous current, which has its load connected in series with voltage control elements and is capable of stepping down only.

Since the series regulator 66 steps-down the voltage while consuming a power, though a loss of power is high compared to the switching regulators 64 and 65, it has few power source ripple, is high in stableness, and small in circuit area. When the input voltage changes, the power consumption by the series regulator 66 itself is continuously adjusted and cancelled, thereby securing a voltage of constant output. Since this series regulator 66 has large power consumption, it is limited to be used for voltage supply to the analogue ASIC 24.

In FIG. 8, though a plurality of series regulators 66 are shown to be connected with one switching regulator 64, they may be separated into and connected to a plurality of switching regulators 64. The connection structures of these switching regulator 64 and the series regulator 66 may be suitably changed according to feed rate and allowable value of the voltage.

<<Operation of Power Supply Apparatus>>

Next, the operation of the power supply apparatus will be described in detail. First, the power source 61 supplies a predetermined AC voltage (for example, 100 to 200 V) to the ACDC converter 62. The ACDC converter 62 converts the AC voltage received from the power source 61 into a DC voltage, and supplies the DC voltage after the conversion to the voltage adjustment device 63 through a feeder wire. At this time, by supplying the medium to high voltage (for example, 48 V and the like), a power loss can be reduced, and a feeder wire circulation can be simplified. Here, for example, in the case of low voltage such as 3 V and the like, the current to flow into the feeder wire becomes large so that a power loss becomes large. On the other hand, in the case of high voltage such as 500 and the like, a member for insulating the feeder wire is needed. Consequently, by meeting the voltages halfway, the supply of the voltage of around 50 V is said to be appropriate. Although the DC voltage from the ACDC converter 62 is supplied to the voltage adjustment device 63 inside each detector unit, the ACDC converter 62 may be provided inside each detector unit 2. In this case, since the AC voltage (for example, 100 to 200 V) may be supplied to each detector unit 2, a loss of power to each detector unit 2 by the feeder wire can be reduced.

In the voltage adjustment device 63, the switching regulator 64 steps-down the DC voltage received from the ACDC converter 62 through the feeder wire to a low voltage (for example, 5 V or 3.3 V, and the like). This stepped-down DC voltage, as shown in FIG. 4, is supplied to the series regulator 66 and the digital signal processing system, to be specific, the time decision circuit 35 which is the elements of the ADC 25 and the digital ASIC 26, the ADC control circuit 36, and the like. On the other hand, the switching regulator 65 boosts the DC voltage similarly received from the ACDC converter 62 through the feeder wire to high voltage (for example, 500 V and the like), and supplies the boosted DC voltage to the detectors 21. This boosted DC voltage is applied between the anode A and the cathode C as charge collection voltage.

Here, though the switching regulators 64 and 65 have the advantages of capable of reducing a loss of power, they have, at the same time, the disadvantages of increasing noise by electromagnetic radiation and the like. Hence, to reduce the noise, the voltage adjustment device 63 provided with the switching regulators 64 and 65 is separated from the analogue system such as the detectors 21, the analogue ASIC 24, and the like by the partition plate 50. However, when an attempt is made to separate the voltage adjustment device 63 from the analogue system, this is sometimes apt to bring about complexity and enlargement of the power supply apparatus 60. In order to cope with this situation, the voltage adjustment device 63 may be mounted (not shown) on the ceiling plate 30a (combination board). In this manner, not only the voltage adjustment device 63 can be separated from the analogue system, but also simplification and miniaturization of the power supply apparatus 60 can be made.

In the voltage adjustment device 63, the series regulator 66 further steps-down (for example, to 3.3 V or 2.5 V and the like) the DC voltage (for example, 5 V) received from the switching regulator 64, and at the same time, reduces the fluctuation of the DC voltage. This stepped down DC voltage outputted from the series regulator 66 is supplied to the analogue ASIC 24, to be specific, a charge amplifier 24b which is the element of the analogue ASIC 24, the timing pick off circuit 24a, the polarity amplifier 24c, the band pass filter 24d, and the peak hold circuit 24e. The use of the series regulator 66 can help supply an accurate and stabilized DC voltage.

<<Specific Effect by Power Supply Apparatus>>

The effect brought about on the PET apparatus by the above described power supply apparatus will be specifically described.

As described above, the separation of the voltage adjustment device 63 including the switching regulators 64 and 65 from the analogue system such as the detectors 21, the analogue ASIC 24, and the like allows the effect of noise generated in the switching regulators 64 and 65 toward the analogue system to be reduced. The γ-ray detection signals outputted from the detectors 21 are weak voltage signals, and are apt to receive the effect of noise. Therefore, it is desirable that the γ-ray detection signals before being amplified by the charge amplifier 24b in the analogue ASIC 24 are prevented from being affected by the noise. In the present embodiment, since the voltage adjustment device 63 which becomes a noise source is disposed in the second region 45, which is separated from the first region 44 disposed in the combined substrate 20 by the partition plate 50, the noise generated in the switching regulators 64 and 65 of the voltage adjustment device 63 is blocked by the partition plate 50 so that it does not reach the detectors 21 and the analogue ASIC 24. In this manner, in the present embodiment, due to noise blocking effect of the partition plate 50, the γ-ray detection signals, particularly, the weak γ-ray detection signals outputted from the detectors 21 are prevented from being adhered with noise.

Further, the use of the series regulator 66 allows highly accurate stabilized DC voltage to be supplied to the analogue ASIC 24. In this case, as shown in FIG. 3A, installing the series regulator 66 in the substrate body 20b of the ASIC substrate 20B similarly to the analogue ASIC 24 and shortening the feeder wire between the series regulator 66 and the analogue ASIC 24 can prevent the effect of noise of the switching regulators 64 and 65 toward the series regulator 66 or the feeder wire, and therefore, it is possible to supply more highly accurate voltage to the analogue ASIC 24.

As described above, the radiation detection signals of the zone low in energy recognized as not detectable due to adverse effect toward the γ-ray detection signals of the noise can be detected by blocking the noise generated in the voltage adjustment device 63 as described above by the partition plate 50. This can improve the detection accuracy of γ-rays in the camera 11 and increase the amount of data effective for tomographic structure, thereby shortening the examination time for the examinee.

That is, presume that in the camera 11 one γ-ray out of the pair of γ-rays emitted from the examinee is incident on one detector 21 inside one detector unit 2 (FIG. 5), and a part of energy (for example, 300 keV) of the one γ-ray is absorbed by this detector 21, and is scattered by that detector 21, and after that, the remaining energy (for example, 211 keV) is absorbed by other detectors 21 included in the layer of the outside. In this case, the γ-ray detection signals are outputted from one detector 21 absorbing the energy and located in the layer of the inside and other detectors 21 located in the layer of the outside. Further, presume that the remaining γ-ray out of the pair of γ-rays is incident on a detector 21 which is 180 degrees on the opposite side of the above described detector 21 inside another detector unit 2 which is located 180 degrees on the opposite side of the above described detector unit 2, and the whole energy of the γ-rays are absorbed by this detector 21. The peak value information of the γ-ray detection signal outputted from this detector 21 becomes the peak value information equivalent to 511 keV.

In case there is a possibility of the noise generated in the voltage adjustment device 63 affecting the γ-ray detection signal, the above described each γ-ray detection signal of 300 keV and 211 keV is not subjected to coincidence measurement with the other γ-ray detection signal of 511 keV in the coincidence apparatus 12A. However, in the present embodiment, since the noise generated in the voltage adjustment device 63 is blocked by the partition plate 50, when a total of peak value information on a plurality of γ-ray detection signals less than 511 keV which enter the time window of the coincidence measurement is the peak value information equivalent to 511 keV, out of a plurality of detector 21 having outputted those γ-ray detection signals, the γ-ray detection signal outputted from the detector 21 where the γ-ray detection signal has initially entered is regarded as having energy of 511 keV and can be taken as an object of the simultaneous measurement. In this manner, the present embodiment can use the γ-ray detection signal of low energy abandoned in case the partition plate 53 is not used, and by that much, can substantially improve the detection sensitivity of γ-rays in the camera 11. For this reason, the data amount usable for tomographic structure can be obtained in a short time, so that the examination time for the examinee can be shortened. One example of the method for identifying the detector 21 initially detecting γ-rays in case the scattering of γ-rays has occurred by the detector 21 is disclosed in JP-A-2003-255048.

Figure 9:
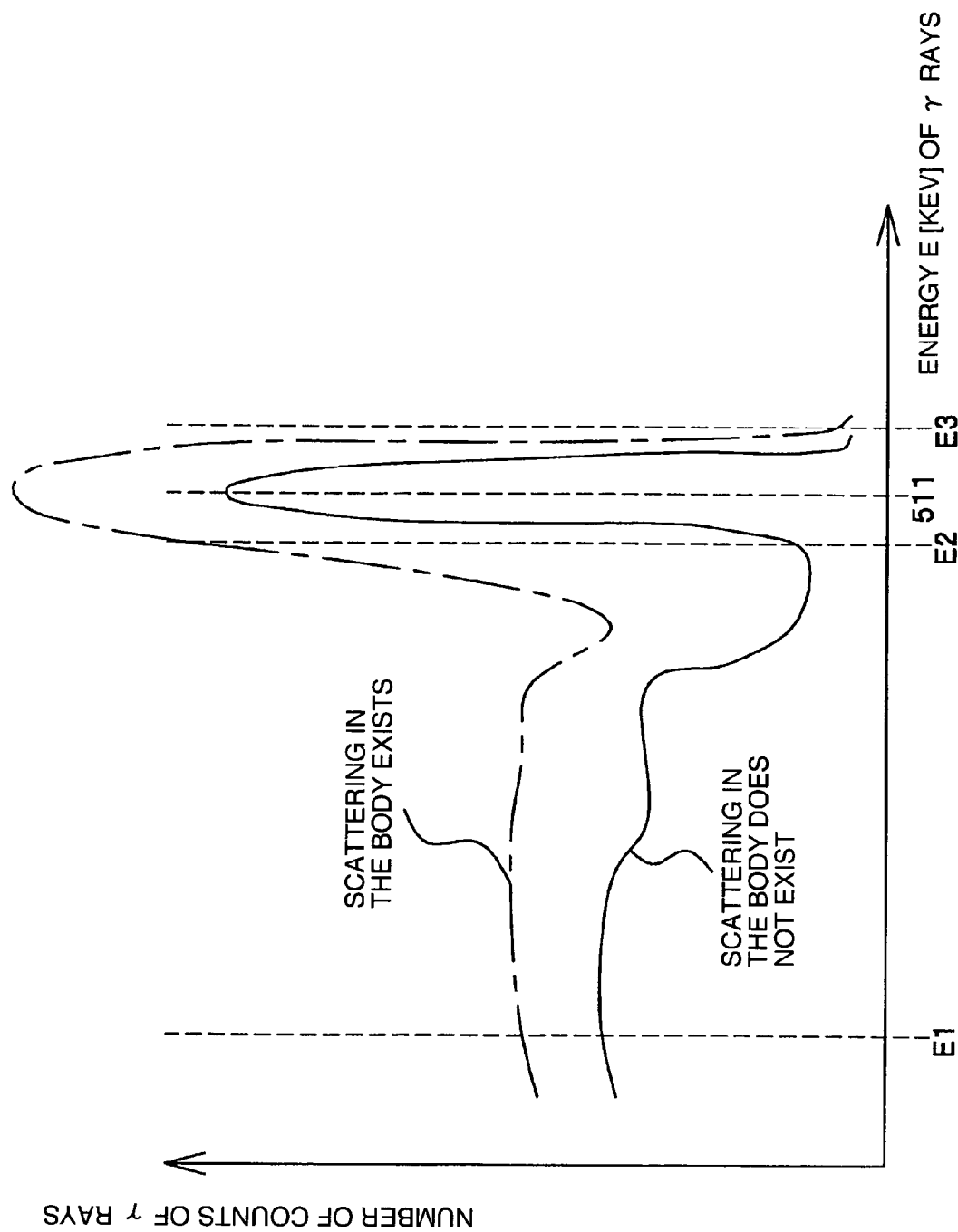
FIG. 9 is a graph showing a relation between an energy E of γ-rays and the number of counts of γ-rays according to the embodiment of the present invention.

FIG. 9 shows a relationship between the number of counts and energy of γ-rays detected by the detector 21 in the case of presence and absence of γ-rays scattered in the body of the examinee. By disposing the switching regulators 64 and 65 which are noise generating sources in the second region 45 which is separated by the partition plate 50, not only effective γ-rays (γ-rays not scattered in the body) having energy in the range of E2 to E3 hovering around 511 keV, but also effective γ-rays having energy (for example, when energy of 511 keV is scattered by the detector 21 energy including 100 keV or 411 keV which is the part thereof) in the range of E1 to E2 are detectable. This means that γ-rays usable for creation of tomographic information are increased. Reduction of the effect of noise can make E1 which is the lower limit value small, that is, the detection range can be expanded till γ-rays of further lower energy. The value such as 100 keV or 411 keV is just one example, and is not particularly high as the value of energy of the scattered γ-rays.

Further, since adoption of the series regulator 66 can reduce fluctuation of the voltage applied to each element (particularly, charge amplifier 24B) of the analogue ASIC 24, E1 which is the lower limit value of energy of γ-rays usable for tomographic information can be made further small. Thus, the examination time can be further shortened.

Further, improvement of energy resolution by the reduction of the noise as well as the fluctuation of voltage can improve an image quality during image structuring. For example, in case there is no scattering of γ-rays in the examinee, γ-rays rise precipitously in the vicinity of E=511 keV (see FIG. 9). This shows that more the noise or voltage fluctuation is reduced, more accurately the detector 21 can detect γ-rays, and that the number of counts in the vicinity of peak value corresponding to E=511 keV increases. In contrast to this, in case γ-rays scatter in the examinee, a uniform distribution of γ-rays is shown in the energy zone of a wide range. Here, γ-rays scattered in the body are those coming out of the body from other places from the transmission source of original γ-rays, and therefore, are not helpful to identify the position of original transmission source. Consequently, it is desirable that γ-rays scattered in the body are not detected.

Thus, for example, when an attempt is made to detect energy of E=511 keV, the detection of unnecessary γ-rays scattered in the body can be reduced by further narrowing down the detection range of E2 to E3. Further, even in case γ-rays of 511 keV not scattered in the body are scattered by the detector 21 (in case γ-rays are scattered by the detector 21, and the scattered γ-rays are detected by another detector 21), the peak values corresponding to the detection range of E1 to E3 are detected by each detector 21, and by confirming that a total value of energy (for example, 100 keV detected by a detector 21 and 411 keV detected by another detector 21) corresponding to these peak values is in the detection range of E2 to E3, that energy can be determined to be effective γ-rays (γ-rays not scattered in the body). Consequently, the energy resolution can be improved by the present invention, and γ-rays (noises) scattered in the body can be reduced, and the image quality can be enhanced.

Further, since the reduction of noise improves time resolution, the image quality during image structuring can be improved. The reduction of noise can hold down fluctuation of the detection time, and make the time window of coincidence measurement small. When the time window becomes small, accidental coincidence measurement event, that is, noise event is reduced, thereby improving the image quality.

Moreover, the effect of improvement of the time resolution by the reduction of noise is significant with respect to the event of lower energy. This is because inclination of the rising of the low energy event signal is small, and therefore, the fluctuation of the detection time due to superimposition of noises becomes large. Consequently, by the reduction of noise, time resolution of low energy event is improved, and event which is left outside the time window (event which is dropped out) can be rescued, and therefore, the number of effective events is increased, so that the examination time can be shortened.

The disposition of the voltage adjustment device 63 in the detector unit 2 eliminates the need for a long high voltage wiring, and up to the voltage adjustment device 63 of the detector unit 2, a lower voltage wiring may be used. For example, in case a high voltage wiring is laid down up to the detector unit 2 provided with the detectors 21 from the power source of the outside, because the high voltage wiring which becomes a noise antenna is long, noise picked up by the high voltage wiring increases, and the γ-ray detection signal which is the output of the detector 21 is affected by that noise. In contrast to this, since the high voltage wiring which becomes the noise antenna is made extremely short, the present embodiment can significantly reduce the effect of the noise taken in by the high voltage wiring toward the γ-ray detection signal of the detector 21. Consequently, E1 which is the lower limit value can be made further small, and the range of the γ-ray detection signal usable for creation of tomographic information can be extended. By that much, the detection sensitivity is improved, and the examination time of the examinee can be further shortened.

Moreover, as described above, supplying the DC voltage of the medium to high voltage (for example, 48 V and the like) to the voltage adjustment device 63 from the ACDC converter 62, and using the switching regulators 64 and 65 in the voltage adjustment device 63 can reduce a loss of power. In this manner, heat value in the PET apparatus 1 is reduced, and therefore, a cooling apparatus for the PET apparatus 1 can be miniaturized. Further, power consumption can be reduced, and therefore, the ACDC converter 62 which is the supply source of power can be also miniaturized. Consequently, the miniaturization of the whole PET apparatus can be realized.

Since in the present embodiment, the combined substrate 20 is disposed in such a manner as to allow the substrate surface provided with the detectors 21 to face in the longitudinal direction of the bed 14, the detectors 21 can be tightly disposed in the circumferential direction of the unit support member 46. Hence, the position resolution at the section orthogonal to the body axis of the examinee can be improved.

Another embodiment of the detector unit will be described below. A detector unit of the present embodiment is provided with two storage members. A first region formed inside one first storage member is provided with a plurality of combined substrates 20, and a second region formed inside the other second storage member is provided with a voltage adjustment device 63. These storage members are combined by a ceiling plate or another combining member. The detector unit of the present embodiment is also installed on a unit support member 46 similarly to the detector unit 2. This detector unit blocks the noise generated in the voltage adjustment device 63 by each side wall of two storage members existing between the combined substrate 20 and the voltage adjustment device 63. The detector unit of the present embodiment can be said to be a detector unit provided with the voltage adjustment device outside of the storage member installed with a plurality of combined substrates. The PET apparatus provided with the detector unit of the present embodiment can obtain the effect generated by the above described PET apparatus 1. However, the detector unit of the present embodiment needs to be provided with two storage members, and becomes more complicated in its structure than the detector unit 2. In other words, the detector unit 2 is more simplified in its structure than the detector unit of the present embodiment.

As another example of the detector unit provided with the voltage adjustment device outside of the storage member installed with a plurality of combined substrates, there is a detector unit available, which is constituted by disposing a plurality of combined substrates inside one storage member and by installing the voltage adjustment device in the external surface of this storage member. The PET apparatus provided with this detector unit can also obtain the effect generated by the above described PET apparatus 1. The present detector unit has a simpler structure than the above described detector unit provided with two storage members.

Although one example of the best mode of preferable embodiment of the present invention has been described as above, it should be understood that the present invention is not limited to the above described embodiment, and can be suitably modified without departing from the scope and sprit of the present invention.

The invention claimed is:

1. A nuclear medicine diagnostic apparatus comprising a support member and a plurality of detector units installed on said support member,
   wherein each of said each detector units includes:
   a storage member;
   a plurality of semiconductor radiation detectors;
   an integrated circuit for processing radiation detection signals outputted by each of said plurality of semiconductor radiation detectors;
   a plurality of substrates stored in said storage member; and
   a voltage adjustment device for applying voltages to said semiconductor radiation detectors and said integrated circuit, said voltage adjustment device being provided outside of said storage member,
   wherein said integrated circuit is provided with an analogue integrated circuit for processing said radiation detection signals, an AD converter for converting an analogue signal which is an output of said analogue integrated circuit into a digital signal, and a digital integrated circuit for inputting said digital signal outputted from said AD converter,
   wherein said voltage adjustment device is provided with a first voltage regulator for supplying the voltages to said digital integrated circuit and said AD converter, and a second voltage regulator for supplying a voltage to said semiconductor radiation detector, and
   wherein each of said detector units is provided with a third voltage regulator connected to said first voltage regulator so as to supply a voltage to said analogue integrated circuit.

2. A nuclear medicine diagnostic apparatus, comprising a support member and a plurality of detector units installed on said support member,
   wherein each of said each detector units includes:
   a storage member;
   a plurality of semiconductor radiation detectors;
   an integrated circuit for processing radiation detection signals outputted by each of said plurality of semiconductor radiation detectors;
   a plurality of substrates stored in said storage member; and
   a voltage adjustment device for applying voltages to said semiconductor radiation detectors and said integrated circuit,
   wherein a partition plate separating a first region inside said storage member disposed with said plurality of substrates from a second region inside the storage member disposed with said voltage adjustment device and controlling a noise generated in said voltage adjustment device is provided inside said storage member,
   wherein said integrated circuit is provided with an analogue integrated circuit for processing said radiation detection signals, an AD converter for converting an analogue signal which is an output of said analogue integrated circuit into a digital signal, and a digital integrated circuit for inputting said digital signal outputted from said AD converter, wherein said voltage adjustment device is provided with a first voltage regulator for supplying voltages to said digital integrated circuit and said AD converter, and a second voltage regulator for supplying a voltage to said semiconductor radiation detectors, and wherein each of said detector units is provided with a third voltage regulator connected to said first voltage regulator so as to supply a voltage to said analogue integrated circuit.

3. The nuclear medicine diagnostic imaging apparatus according to claim 2, wherein said detector unit is installed in said support member in a detachable/attachable manner.

4. The nuclear medicine diagnostic apparatus according to claim 2, comprising a tomographic information creation apparatus for creating tomographic information by using second information obtained based on first information outputted from said integrated circuit.

5. The nuclear medicine diagnostic apparatus according to claim 2, wherein said third voltage regulator is installed one of said plurality of substrates.

6. The positron emission tomography apparatus according to claim 2, wherein said plurality of substrates include a first substrate having said semiconductor radiation detector and a second substrate mounted on the first substrate in a detachable and attachable manner and having said integrated circuit, and wherein said third voltage regulator is provided in said second substrate.

7. The positron emission tomography apparatus according to claim 2, wherein said first and second voltage regulators are switching regulators, and said third voltage regulator is a series regulator.

8. The positron emission tomography apparatus according to claim 2, wherein said first voltage adjustment device steps-down the voltage supplied from the outside of said detector unit, and a second voltage adjustment device boosts said voltage, and said third voltage regulator steps-down said voltage supplied from said first voltage regulator.

9. A positron emission tomography apparatus, comprising a bed supporting a subject to be examined and a plurality of detector units installed surrounding the circumference of said bed, wherein each of said detector units includes:
a storage member;
a plurality of semiconductor radiation detectors;
an integrated circuit for processing radiation detection signals outputted by each of said plurality of semiconductor radiation detectors;
a plurality of substrates stored inside said storage member; and
a voltage adjustment device for applying voltages to said semiconductor radiation detectors and said integrated circuit, said voltage adjustment device being provided outside of said storage members, wherein said integrated circuit is provided with an analogue integrated circuit for processing said radiation detection signals, an AD converter for converting an analogue signal which is an output of said analogue integrated circuit into a digital signal, and a digital integrated circuit for inputting said digital signal outputted from said AD converter, wherein said voltage adjustment device is provided with a first voltage regulator for supplying voltages to said digital integrated circuit and said AD converter, and a second voltage regulator for supplying voltage to said semiconductor radiation detector, and wherein each of said detector units is provided with a third voltage regulator is provided, which is connected to said first voltage regulator so as to supply a voltage to said analogue integrated circuit.

10. A positron emission tomography apparatus comprising a bed supporting a subject to be examined and a plurality of detector units installed surrounding the circumference of said bed, wherein each of said detector unit includes:
a storage member;
a plurality of semiconductor radiation detectors;
an integrated circuit for processing radiation detection signals outputted by each of said plurality of semiconductor radiation detectors;
a plurality of substrates stored inside said storage member; and
a voltage adjustment device for applying voltages to said semiconductor radiation detectors and said integrated circuit, and wherein a partition plate separating a first region inside said storage member installed with said plurality of substrates from a second region inside said storage member installed with said voltage adjustment device and controlling noise generated in said voltage adjustment device is provided inside said storage member, wherein said integrated circuit is provided with an analogue integrated circuit for processing said radiation detection signals, an AD converter for converting an analogue signal which is an output of said analogue integrated circuit into a digital signal, and a digital integrated circuit for inputting said digital signal outputted from said AD converter, wherein said voltage adjustment device is provided with a first voltage regulator for supplying voltages to said digital integrated circuit and said AD converter, and a second voltage regulator for supplying a voltage to said semiconductor radiation detector, and wherein each of said radiation detectors is provided with a third voltage regulator connected to said first voltage regulator so as to supply the voltage to said analogue integrated circuit.

11. The positron emission tomography apparatus according to claim 10, wherein each of said substrates is installed in the direction to cross the longitudinal direction of said bed, and the surface where said semiconductor radiation detectors are provided is oriented and disposed in said longitudinal direction.

12. The positron emission tomography apparatus according to claim 10, wherein said plurality of substrates include a first substrate having said semiconductor radiation detector and a second substrate mounted on the first substrate in a detachable and attachable manner and having said integrated circuit, and wherein said third voltage regulator is provided in said second substrate.

13. The positron emission tomography apparatus according to claim 10, wherein said first and second voltage regulators are switching regulators, and said third voltage regulator is a series regulator.

14. The positron emission tomography apparatus according to claim 10, wherein said first voltage adjustment device steps-down the voltage supplied from the outside of said detector unit, and a second voltage adjustment device boosts said voltage, and said third voltage regulator steps-down said voltage supplied from said first voltage regulator.

15. The positron emission tomography apparatus according to claim 10, comprising a coincidence apparatus for performing simultaneous count based on first information outputted from said integrated circuit and a tomographic information creation apparatus for creating tomographic information by using second information outputted from said coincidence apparatus.

16. The positron emission tomography apparatus according to claim 10, comprising a support member installed surrounding the circumference of said bed, and installed with said plurality of detector units in a detachable and attachable manner.

17. The nuclear medicine diagnostic apparatus according to claim 10, wherein said third voltage regulator is installed one of said plurality of substrates.

* * * * *